United States Patent
Brown

(10) Patent No.: US 9,033,013 B2
(45) Date of Patent: May 19, 2015

(54) UNDERCUT STONE BUMPER STRUCTURE FOR VEHICLE TIRE GROOVE

(75) Inventor: Robert F. Brown, Mt. Vernon, IL (US)

(73) Assignee: CONTINENTAL TIRE NORTH AMERICA, INC., Charlotte, NC (US)

( * ) Notice: Subject to any disclaimer, the term of this patent is extended or adjusted under 35 U.S.C. 154(b) by 1775 days.

(21) Appl. No.: 12/155,615

(22) Filed: Jun. 6, 2008

(65) Prior Publication Data

US 2009/0301622 A1  Dec. 10, 2009

(51) Int. Cl.
*B60C 11/04* (2006.01)
*B60C 11/13* (2006.01)
*B60C 11/03* (2006.01)

(52) U.S. Cl.
CPC ........... *B60C 11/0306* (2013.04); *B60C 11/042* (2013.04); *B60C 11/045* (2013.01); *B60C 11/04* (2013.01); *B60C 11/047* (2013.04); *B60C 11/1323* (2013.04); *B60C 2011/1338* (2013.04)

(58) Field of Classification Search
CPC .................. B60C 11/1323; B60C 2011/1338; B60C 11/042; B60C 11/045
USPC ........... 152/209.21, 900, 901, DIG. 1, DIG. 3
See application file for complete search history.

(56) References Cited

U.S. PATENT DOCUMENTS

| | | | |
|---|---|---|---|
| 2,056,131 A * | 9/1936 | Brittain | 152/209.21 |
| 2,121,871 A * | 6/1938 | Havens | 152/209.21 |
| 2,290,625 A | 8/1940 | Stein | |
| 2,661,041 A | 3/1950 | Walsh | |
| 3,095,024 A * | 6/1963 | Robertson | 152/209.21 |
| 3,546,749 A * | 12/1970 | Wissel | 425/35 |
| 5,361,815 A | 11/1994 | Loser et al. | |
| 5,503,207 A * | 4/1996 | Ochiai et al. | 152/209.21 |
| 6,412,531 B1 * | 7/2002 | Janajreh | 152/209.21 |

FOREIGN PATENT DOCUMENTS

| | | | |
|---|---|---|---|
| DE | 1480927 A | * | 3/1969 |
| EP | 989000 A2 | * | 3/2000 |
| JP | 62-194909 A | * | 8/1987 |
| JP | 01-153304 A | * | 6/1989 |

(Continued)

OTHER PUBLICATIONS

Machine translation for Germany 1,480,927 (no date).*

(Continued)

*Primary Examiner* — Steven D Maki
(74) *Attorney, Agent, or Firm* — Greenblum & Bernstein, P.L.C.

(57) ABSTRACT

A tire (10) having a tread (12) includes a plurality of laterally spaced, circumferentially extending continuous ribs (11) defining grooves (14). Each groove has oppositely facing sidewalls (20, 22) and a bottom surface (30). A first set of stone bumpers is provided with each stone bumper (18) projecting laterally from one of the sidewalls with an end (24) extending towards the other sidewall of the groove. A second set of stone bumpers is provided with each stone bumper (18') projecting from the other sidewall with an end (26) extending towards the one sidewall of the groove. Each stone bumper of the first and second sets of stone bumpers 1) is integral with the associated sidewall and with a portion of the bottom surface of the groove, and 2) includes a cutout (34) defining a surface that is spaced from and in opposing relation to the bottom surface of the groove.

20 Claims, 3 Drawing Sheets

(56) References Cited

FOREIGN PATENT DOCUMENTS

| JP | 03-276802 A | * | 12/1991 |
| JP | 09-164814 A | * | 6/1997 |

OTHER PUBLICATIONS

Machine translation for Japan 09-164814 (no date).*
Machine translation for Europe 989,000 (no date).*

* cited by examiner

UNDERCUT STONE BUMPER STRUCTURE FOR VEHICLE TIRE GROOVE

FIELD OF THE INVENTION

The invention relates to tread patterns of medium radial truck tires and, more particularly, to providing undercut stone bumper structure in grooves of tire treads to prevent stones or other debris from penetrating the groove bottom and damaging the belts of the tire.

BACKGROUND OF THE INVENTION

Tire treads for truck tires typically pick up small stones, gravel or other debris. Conventionally, a stone bumper structure is provided in grooves of the tire tread so as to prevent the stones or debris from contacting a bottom of the groove. However, conventional stone bumper structures that are attached to the sidewall of a groove in a cantilever manner, such as those disclosed in U.S. Pat. No. 2,661,041, have a propensity for cracking due to the stresses thereon. If the stone bumper structures crack or fracture, there is a greater likelihood that stones can enter the groove, penetrate the bottom of the groove and damage the tire belts.

Thus, there is a need provide improved stone bumper structure in grooves of tire treads.

SUMMARY OF THE INVENTION

An object of the invention is to fulfill the need referred to above. In accordance with the principles of the disclosed embodiments, this objective is obtained by providing a tire having a tread. The tread includes a plurality of laterally spaced, circumferentially extending continuous ribs defining grooves. Each groove has oppositely facing sidewalls and a bottom surface. A first set of stone bumpers is provided with each stone bumper of the first set projecting laterally from one of the sidewalls of at least one of the grooves with an end extending towards the other sidewall of the at least one groove. A second set of stone bumpers is provided with each stone bumper of the second set projecting from the other sidewall of the at least one groove with an end extending towards the one sidewall of the at least one groove. Each stone bumper of the first and second sets of stone bumpers 1) is integral with the associated sidewall and with a portion of the bottom surface of the least one groove, and 2) includes a cutout defining a surface that is spaced from and in opposing relation to the bottom surface of the at least one groove.

In accordance with another aspect of the disclosed embodiments, a tire tread includes a plurality of laterally spaced, circumferentially extending continuous ribs defining grooves. Each groove has oppositely facing sidewalls and a bottom surface. A plurality of stone bumpers project laterally from at least one of the sidewalls of at least one of the grooves, with an end of each stone bumper extending within the groove towards the opposing sidewall. Each stone bumper 1) has a generally planar top surface, 2) is integral with the sidewall and with a portion of the bottom surface of the least one groove, and 2) includes a cutout defining a bottom surface that is spaced from and opposes the bottom surface of the at least one groove.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
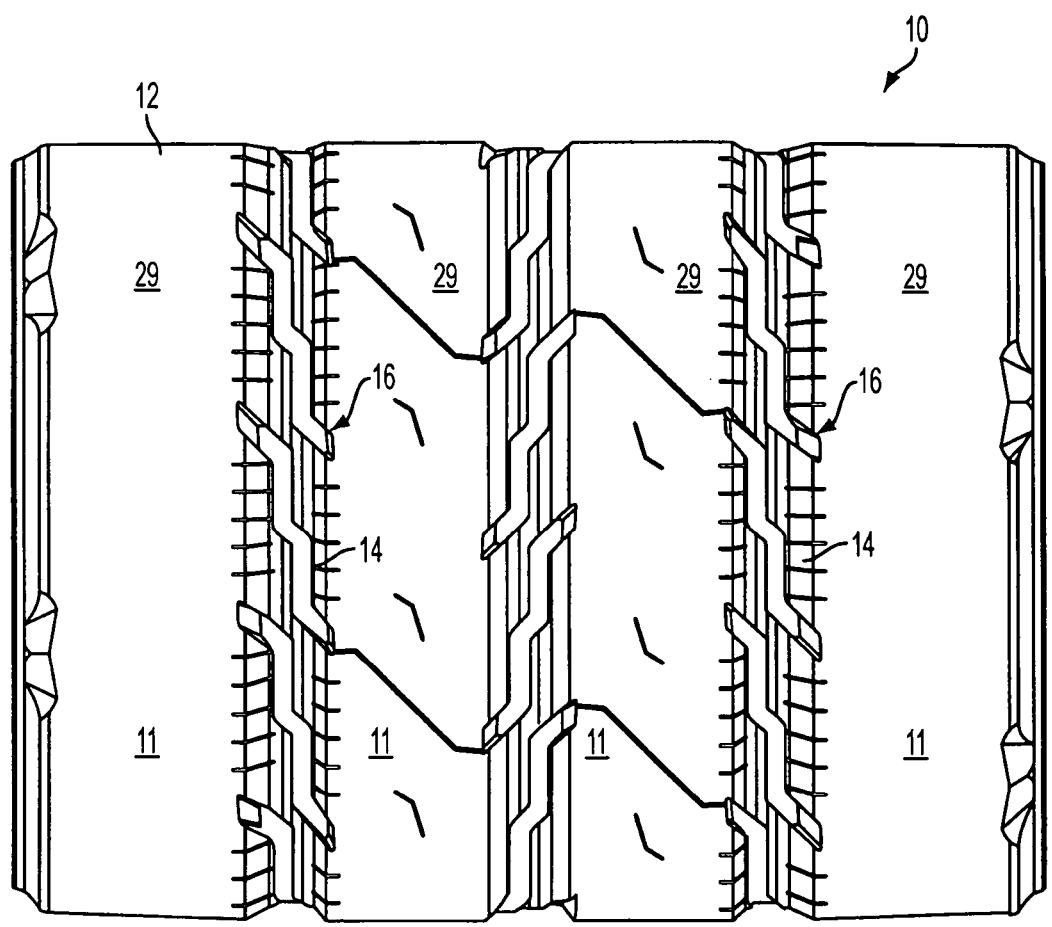
FIG. 1 is a plan view of a portion of a tire tread including stone bumper structure in grooves thereof, provided in accordance with the principles of an embodiment of the present invention.

With reference to FIG. 1, a portion of a tire tread, generally indicated at 10, of a vehicle tire 12, is shown in accordance with a first embodiment. The tread 10 includes a plurality of laterally spaced, circumferentially extending continuous ribs 11 defining grooves 14. In the embodiment, each of the grooves 14 includes stone bumper structure, generally indicated at 16 therein. It can be appreciated that if desired, each groove 14 need not include the stone bumper structure 16. However, it is preferable to provide the stone bumper structure 16 in all grooves 14.

Figure 2:
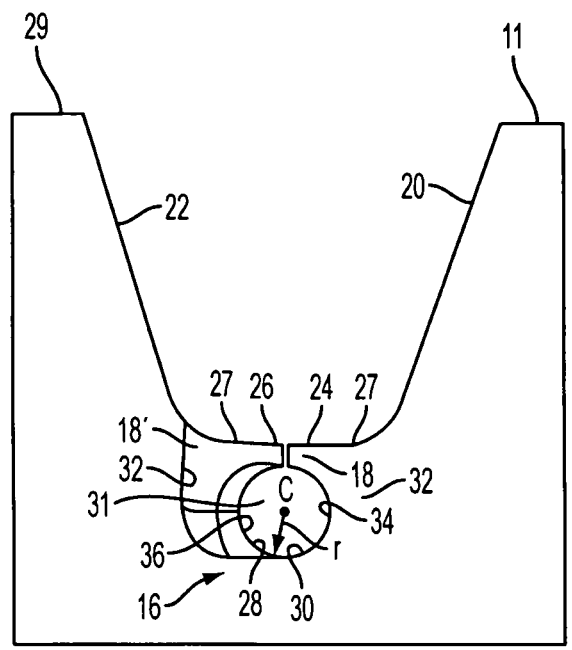
FIG. 2 is an enlarged sectional view of a groove of the tread of FIG. 1, showing a stone bumper structure therein.
Figure 3:
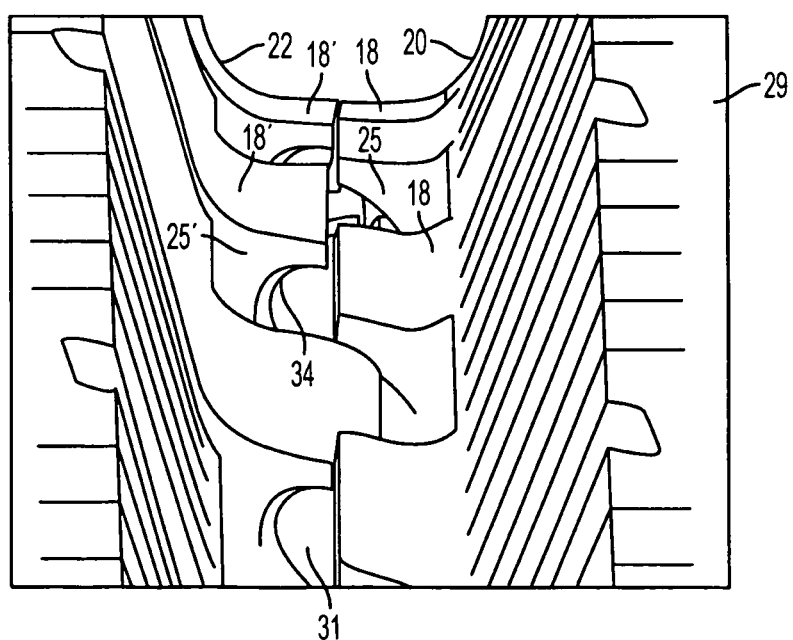
FIG. 3 is an enlarged perspective view of the groove of FIG. 2.

As best shown in FIGS. 2 and 3, in each groove 14, the stone bumper structure 16 includes circumferentially arranged stone bumpers 18 and 18'. A first set of stone bumpers is provided with each stone bumper 18 of the first set being integral with and projecting laterally from one sidewall 20 of the groove 14 towards a center C of the groove 14. A second set of stone bumpers is provided with each stone bumper 18' being integral with and projecting from the opposite sidewall 22 towards the center C of the groove 14. Thus, the ends 24 and 26 of the bumpers 18 and 18, respectively, are disposed generally at the center C of the groove 14. In the embodiment, the bumpers 18 are disposed along the groove 14 defining a space 25 between successive bumpers 18. The bumpers 18' are similarly disposed, defining a space 25' between successive bumpers 18'. Furthermore, at least portions of the ends 24 and 26 of the respective bumpers 18, 18' are in generally abutting relation.

The bumpers 18, 18' are substantially identically configured and thus have substantially the same length of top surface 27. However, it can be appreciated one of the bumper 18 can have a top surface 27 of a length greater than the other bumper 18'. The top surface 27 of each bumper 18, 18' is generally planar and rectangular and is spaced from the road engaging surface 29 of the ribs 11 to prevent stones or the like from being trapped under the bumpers 18, 18' in the grooves 14.

As best shown in FIG. 2, each bumper 18, 18' has a bottom 28 integral with the bottom surface 30 of the groove 14 and a side 32 integral with the associated sidewall (20 or 22) of the groove 14.

In accordance with the principles of the present embodiment, each bumper 18, 18' has an undercut 34 therein defining an arc-shaped bottom surface 36 that is spaced from and opposes the bottom surface 30 of the groove 14 such that the end 24 or 26 of the bumpers 18, 18' are flexible. Each bumper 18, 18' is coupled to the bottom surface 30 of the groove 14 using a radius r of about 1 mm to 5 mm. Thus, as best shown in FIG. 2, the cutouts 34 create a channel 31 adjacent to the bottom surface of the groove 14.

Figure 4:
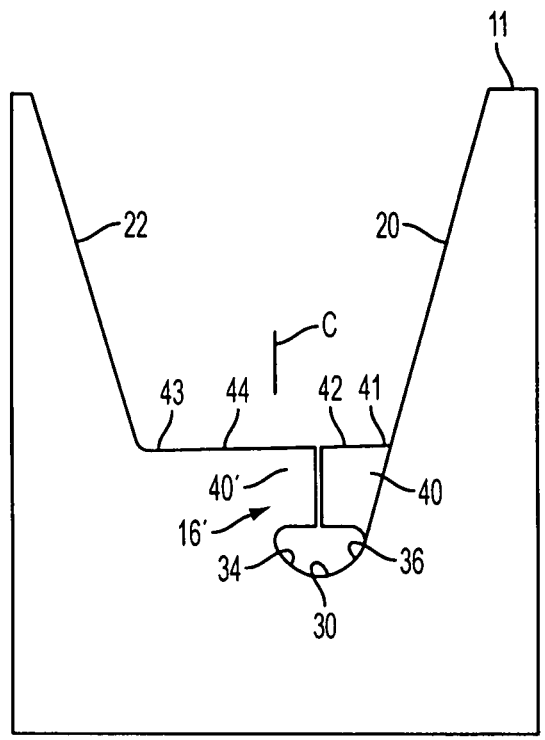
FIG. 4 is an enlarged sectional view of a groove of the tread of another embodiment of the invention, showing a stone bumper structure therein.
Figure 5:
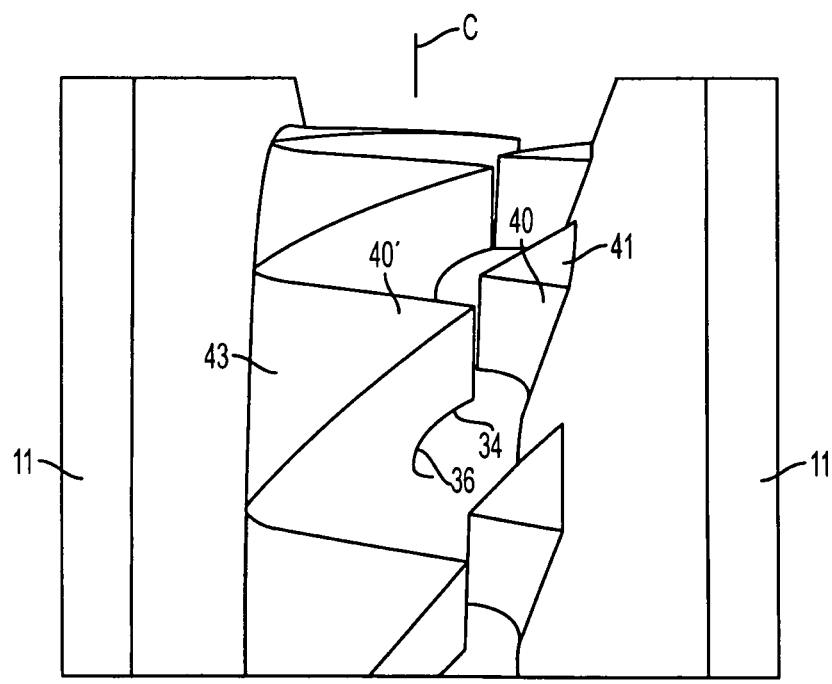
FIG. 5 is an enlarged perspective view of the groove of FIG. 4.

FIGS. 4 and 5 show another embodiment of undercut stone bumper structure 16'. Each stone bumper 40 has a top surface 41 of substantially the same length and each stone bumper 40' a top surface 43 of substantially the same length. A length of the top surface 43 of each stone bumper 40' is greater than a length of a top surface 41 of each stone bumper 40. Thus, ends 42 and 44 of the bumpers 40 and 40', respectively, are offset from the center C of the groove 14. Furthermore, the top surface 41, 43 of each bumper 40, 40' is generally planar and of triangular shape. Each bumper 40 and 40' is otherwise similar to each bumper 18, 18', e.g., being integral with the associated sidewall 20, 22 and bottom surface 30 of the groove 14 and having the undercut 34 defining the arc-shaped surface 36.

Due to the configuration of the bumpers 18, 18', and 40, 40' (e.g., no cantilever structure), stress thereon is reduced and the bumpers are less likely to crack. In addition, since the stone bumper structure 16, 16' is preferably provided in all grooves 14 the tread pattern groove appearance and hence the overall tread pattern appearance is consistent. This is not the case with conventional stone bumpers since they are not provided in all grooves.

Although the embodiments disclosed herein show two sets of bumpers extending from opposite sidewalls of the groove 14, it can be appreciated that the bumpers can be integral with one sidewall of the groove and extend across the groove to be adjacent to the opposing sidewall. As with the other embodiments, the bumper would be integral with the one sidewall and with the bottom of the groove, and would include the cutout.

Thus, the undercut stone bumper structures 16, 16' provide an effective way to prevent stones from entering a groove in a tire and thus prevent tire damage.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A tire having a tread, the tread comprising:
a plurality of laterally spaced, circumferentially extending continuous ribs defining grooves,
each groove having oppositely facing sidewalls and a bottom surface,
a first set of stone bumpers alternating with spaces between adjacent stone bumpers,
each stone bumper of the first set projecting laterally from one of the sidewalls of at least one groove and having an end extending towards the other sidewall of the at least one groove without extending beyond a centerline of the at least one groove,
a second set of stone bumpers alternating with spaces between adjacent stone bumpers,
each stone bumper of the second set projecting from the other sidewall of the at least one groove and having an end extending towards the one sidewall of the at least one groove without extending beyond the centerline of the at least one groove,
the stone bumpers of the first set of stone bumpers being arranged opposite the spaces of the second set of stone bumpers of said at least one groove,
the ends of the first set of stone bumpers circumferentially overlapping the ends of the second set of stone bumpers,
wherein each stone bumper of the first and second sets of stone bumpers:
is integral with the associated sidewall and with a portion of the bottom surface of the least one groove,
has a thickness that varies from the sidewall to the end, and
includes a cutout defining a surface that is spaced from and in opposing relation to the bottom surface of the at least one groove,
wherein the first and second sets of stone bumpers are arranged closer to the bottom surface of the at least one groove than to a road engaging surface of the ribs, and
wherein an entire portion of said at least one groove located between the road engaging surface and the first and second set of stone bumpers is free of stone bumpers.

2. The tire of claim 1, wherein the surface defined by the cutout is arc-shaped.

3. The tire of claim 2, wherein each stone bumper is coupled to the bottom surface of the at least one groove using a radius of about 1 mm to 5 mm.

4. The tire of claim 1, wherein each stone bumper of both the first and second sets has a top surface of substantially the same length.

5. The tire of claim 4, wherein each top surface is generally planar and of generally rectangular shape.

6. The tire of claim 1, wherein the first and second sets of stone bumpers are provided in each groove.

7. The tire of claim 1, wherein each stone bumper is spaced from a road engaging surface of the ribs by the same amount.

8. The tire tread of claim 1, wherein the stone bumpers are structured and arranged to prevent stones or debris from contacting the bottom surface of the at least one groove and an upper surface of the stone bumpers is spaced from the road engaging surface by an amount greater than a spacing between a bottom surface of the at least one groove and the surface that is spaced from and in opposing relation to the bottom surface of the at least one groove.

9. A tire having a tread, the tread comprising:
a plurality of laterally spaced, circumferentially extending continuous ribs defining grooves,
each groove having oppositely facing sidewalls and a bottom surface,
a first set of stone bumpers,
each stone bumper of the first set projecting laterally from one of the sidewalls of at least one groove and having an end extending towards the other sidewall of the at least one groove,
a second set of stone bumpers,
each stone bumper of the second set projecting from the other sidewall of the at least one groove and having an end extending towards the one sidewall of the at least one groove,
wherein each stone bumper of the first and second sets of stone bumpers:
is integral with the associated sidewall and with a portion of the bottom surface of the least one groove, and
includes a cutout defining a surface that is spaced from and in opposing relation to the bottom surface of the at least one groove, wherein the first and second sets of stone bumpers are arranged closer to the bottom surface of the at least one groove than to a road engaging surface of the ribs, and wherein each stone bumper of the first set has a top surface of substantially the same length and each stone bumper of the second set has a top surface of substantially the same length, with the length of the top surface of each stone bumper of the second set being greater than a length of a top surface of each stone bumper of the first set.

10. The tire of claim 9, wherein each top surface is generally planar and of generally triangular shape.

11. A tire tread comprising:
a plurality of laterally spaced, circumferentially extending continuous ribs defining grooves,
each groove having oppositely facing sidewalls and a curved bottom surface,
a plurality of stone bumpers alternating with spaces between adjacent stone bumpers projecting laterally from one sidewall of at least one groove,
a plurality of stone bumpers alternating with spaces between adjacent stone bumpers projecting laterally from an opposite sidewall of the least one groove,
an end of each stone bumper extending within the groove towards the opposing sidewall,
each stone bumper having a generally planar top surface and being integral with the sidewall and with a portion of the bottom surface of the least one groove, and
a cutout arranged between the stone bumpers and the bottom surface of the at least one groove,
the ends of the stone bumpers projecting from the one sidewall circumferentially overlapping the ends of the stone bumpers projecting from the opposing sidewall,
the ends of all stone bumpers of the at least one groove not extending beyond a centerline of the at least one groove,
wherein the stone bumpers are arranged closer to the bottom surface of the at least one groove than to a road engaging surface of the ribs, and
wherein an entire portion of said at least one groove located between the road engaging surface and the stone bumpers is free of stone bumpers.

12. The tire tread of claim 11, wherein each stone bumper is coupled to the bottom surface of the at least one groove using a radius of about 1 mm to 5 mm.

13. The tire tread of claim 11, wherein the top surface of each oppositely arranged stone bumper has substantially the same length.

14. The tire tread of claim 11, wherein the stone bumpers are provided in each groove.

15. The tire tread of claim 11, wherein each stone bumper is spaced from a road engaging surface of the ribs by the same amount.

16. The tire tread of claim 11, wherein the stone bumpers are structured and arranged to prevent stones or debris from contacting the bottom surface of the at least one groove and wherein the side walls of the at least one groove widen from the stone bumpers to the road engaging surface.

17. A tire tread comprising:
a plurality of laterally spaced, circumferentially extending continuous ribs defining grooves,
each groove having oppositely facing sidewalls and a bottom surface,
a plurality of first stone bumpers projecting laterally from at least one of the sidewalls of at least one of the grooves,
a plurality of second stone bumpers projecting laterally from an opposing sidewall of the at least one of the grooves,
each stone bumper of the first and second stone bumpers having a generally planar top surface and being integral with the sidewall and with a portion of the bottom surface of the least one groove, and
a cutout arranged between the first and second stone bumpers and the bottom surface of the at least one groove, the cutout defining a bottom surface of the stone bumpers that is spaced from and opposes the bottom surface of the at least one groove,
wherein the first and second stone bumpers are arranged closer to the bottom surface of the at least one groove than to a road engaging surface of the ribs, and
wherein the top surface of each stone bumper of the first stone bumpers is of substantially the same length and the top surface of each stone bumper of the second stone bumpers is of substantially the same length, with the length of the top surface of each stone bumper of the second stone bumpers being greater than a length of a top surface of each stone bumper of the first stone bumpers.

18. The tire tread of claim 17, wherein each top surface is of rectangular or triangular shape.

19. A tire having a tread, the tread comprising:
a plurality of laterally spaced, circumferentially extending continuous ribs defining grooves,
each groove having oppositely facing sidewalls and a bottom surface,
a first set of stone bumpers alternating with spaces between adjacent stone bumpers and being integrally with and projecting laterally from one of the sidewalls of at least one of the grooves and having an end extending towards the other sidewall of the at least one groove without extending beyond a centerline of the at least one groove,
a second set of stone bumpers alternating with spaces between adjacent stone bumpers and being integral with and projecting from the other sidewall of the at least one groove and having an end extending towards the one sidewall of the at least one groove without extending beyond a centerline of the at least one groove,
the ends of the second set of stone bumpers circumferentially overlapping the ends of the first set of stone bumpers,
a channel defined by a curved bottom surface of the at least one groove and bottom surfaces of the first and second set of stone bumpers, and
upper edges or surfaces of the ends of the first and second sets of stone bumpers being arranged closer to the bottom surface of the at least one groove than to a road engaging surface of the ribs,
wherein the stone bumpers are structured and arranged to prevent stones or debris from contacting the bottom surface of the at least one groove, and
wherein an entire portion of said at least one groove located between the road engaging surface and the first and second sets of stone bumpers is free of stone bumpers.

20. The tire tread of claim 19, wherein the side walls of the at least one groove widen continuously from the stone bumpers to the road engaging surface.

* * * * *